UNITED STATES PATENT OFFICE.

GEORGE DURYEE, OF NEW YORK, N. Y.

BRICK AND FIRE-PROOF LINING FOR FURNACES.

SPECIFICATION forming part of Letters Patent No. 271,437, dated January 30, 1883.

Application filed May 4, 1882. (No specimens.)

*To all whom it may concern:*

Be it known that I, GEORGE DURYEE, a citizen of the United States, residing at New York, in the county and State of New York, have invented certain new and useful Improvements in Fire-Proof Linings, Bricks, &c., of which the following is a specification.

The present invention belongs to the class of basic refractory compositions for lining metallurgical furnaces, forming tuyeres, and other objects required to withstand a high degree of heat.

The invention consists in a composition formed of titaniferous iron ore, fire-clay, graphite, and a mucilaginous binding material; also, in applying a glaze to the brick or other molded object, for preventing the burning out of the carbon contained therein during the firing operation.

I will proceed to describe the method of manufacture, first, of brick; second, of a continuous lining to be built in furnaces, cupolas, Bessemer converters, &c.; and, third, of a crucible of my improved mixture. The ingredients employed are titaniferous iron ore, (by weight,) one hundred pounds; best fire-clay, one hundred pounds; graphite, one hundred pounds; molasses, twenty pounds, (or less.) The first three named are ground and mixed, heated to a high temperature, and dried. While very hot a sufficient amount of molasses is added gradually to reduce the mixture to a stiff mortar of about the consistency of putty. While the mixture is still hot it is molded in suitable molds. These are preferably of iron, so as to admit of their being oiled. The bricks are then cooled, becoming very hard, especially if pressure is applied to them while still in the molds. As soon as properly cooled they are dipped in a protecting or glazing mixture of silicate of soda, or an admixture of salt and clay in water or equivalent substance, which gives a glaze to the bricks, and, when burning in the furnace, protects them from the oxygen of the flame and the consequent burning out of the carbon. The molasses in the mixture acts as a temporary bond at first while the bricks are burning, and, after burning out its water of combination, it is changed into carbon. Thus one hundred pounds of molasses gives about fifty pounds of carbon to the mixture. I have used other forms of carbon, such as pitch, coal-tar, &c.; but molasses holds the ingredients together more firmly and does not burn out. Other equivalent mucilaginous carbonaceous material may, however, be used where the greatest heats are not to be applied to the bricks.

My method of forming a firm and continuous lining of this mixture on the wall of a cylindrical furnace such as I have described in another application for patent is as follows: In the puddling portion of the furnace, and for a distance up the cylinder proper, hooks, projecting inward about eight inches and fastened at their outer ends to the shell of the cylinder by heads or nuts, are fixed at distances of about eighteen inches apart. Then a mixture of fire-clay, graphite, (or plumbago,) and titaniferous iron ore, in substantially the proportions before given, is made and heated in a suitable iron tank. When sufficiently hot, boiling molasses (or other suitable mucilaginous material) is added until the whole mass becomes tenacious and of about the consistency of putty. This mixture is taken up on shovels, and a longitudinal section of the cylinder—say one-third—is lined therewith to a thickness of twelve inches. Care should be taken that the whole be well hammered into a compact body with large mauls and well tamped around the hooks before described, so as when cooled to make a hard and firm lining. When this section is finished a wood-fire should be made on it and the lining well baked, after which a second and third section are laid on in the same manner. When the whole furnace is lined it should be faced with a thin layer of salt, which fuses with the alumina and silica under the great heat of my furnace, making a strong and permanent glaze.

The mixture described is applicable not only to the purposes of making refractory bricks and linings, but may be used in the manufacture of crucibles and other articles to advantage. For example, a crucible needing no burning previous to being used can be made in the following manner: The mixture, properly mixed and heated as described, may be molded on a potter's wheel by hand, if done while the mass is hot and kept hot while molding, or, preferably, the hot mass should be pressed in molds of the required shape and size. After cooling they will be hard and firm enough to dip them in a solution of silicate of soda or equivalent material, and be dried, when they will be ready for use in the furnace, but should be heated gradually.

A lining made in the manner I have described I have found non-fusing and withstanding a heat of 5,000° Fahrenheit.

I am aware that a refractory compound formed of titaniferous magnetite, ilmenite, or common magnetic iron ore, and graphite and fire-clay has heretofore been proposed as a basic lining for furnaces.

I claim—

1. The refractory composition herein described, consisting of titaniferous iron ore, fire-clay, plumbago, and a mucilaginous and carboniferous binding material, in or about the proportions specified.

2. The method of applying a protective coating or glaze to a refractory compound containing a carboniferous binding agent before the operation of firing the same, as and for the purpose set forth.

GEORGE DURYEE.

Witnesses:
AMOS HOWES,
CHARLES THIES.